Dec. 13, 1955 H. HURVITZ 2,727,100

DISTRIBUTED AMPLIFIERS

Filed Feb. 12, 1953

INVENTOR

Hyman Hurvitz

United States Patent Office 2,727,100

Patented Dec. 13, 1955

2,727,100

DISTRIBUTED AMPLIFIERS

Hyman Hurvitz, Washington, D. C., assignor to Melpar, Inc., Alexandria, Va., a corporation of New York Application February 12, 1953, Serial No. 336,517

12 Claims. (Cl. 179—171)

The present invention relates generally to distributed amplifiers, and more particularly to distributed amplifiers in which like electrodes of the amplifier tubes are connected to points of mutually displaced phase along respectively different conductors of a multi-conductor transmission line, thereby to insulate the electrodes, one from another, and to permit utilization of triodes as amplifying elements of the amplifier.

It is a broad object of the invention to provide a distributed amplifier capable of utilizing ultra high frequency triodes as amplifying elements.

It is another object of the present invention to provide a distributed amplifier employing triodes, in which isolation among the triodes is obtained by connecting distinct conductors of a single transmission line to tube electrodes of a given kind, in the amplifier.

Briefly describing the invention, it is known that the use of tetrodes or pentodes as amplifying elements of distributed amplifiers radically restricts the upper cut-off limit of such amplifiers, and that while triodes may be substituted, which are per se capable of operation at extremely high frequencies, the use of triodes leads to complications because of inter-electrode coupling. The problem is, then, to provide a distributed amplifier in which triodes are employed, but in which feed-through between tubes is eliminated. In this way one eliminates the basic impediment to the use of triodes in distributed amplifiers, since the basic difficulty resides in the feed-back from tube to tube via the electrodes of each tube, or, otherwise stated, to the fact that insufficient isolation of transmission lines exists, in the amplifier.

In accordance with the present invention, I provide separate transmission line conductors for corresponding elements of the tubes of a distributed amplifier, and these may be grid conductors, or plate conductors, or cathode conductors, or a plurality of these. These transmission line conductors are not closely coupled, and to a first approximation at least, may be considered isolated. The net result is isolation of the corresponding electrodes. If, to provide an example, the grid electrodes only of a distributed amplifier are mutually isolated, by connection of each to a different transmission line conductor, and each fed with the same signal in mutually dephased relation, by connection to appropriate points of the conductors, signal feed-through from anode to grid of one tube does not appear at the grid of any other tube. If the anodes are decoupled, anode signal in one tube cannot reach the anode of any other tube. If both grids and anodes are isolated, no signal feed from one tube to any other is possible. Yet the outputs of the separate tubes appear in co-phasal relation in the output of the system, and add there, to provide the useful result characteristic of distributed amplifiers.

The above features, objects and advantages of the present invention will become apparent upon consideration of the following detailed disclosure of various specific embodiments of my invention, especially when taken in conjunction with the accompanying drawings, wherein.

Figure 1:
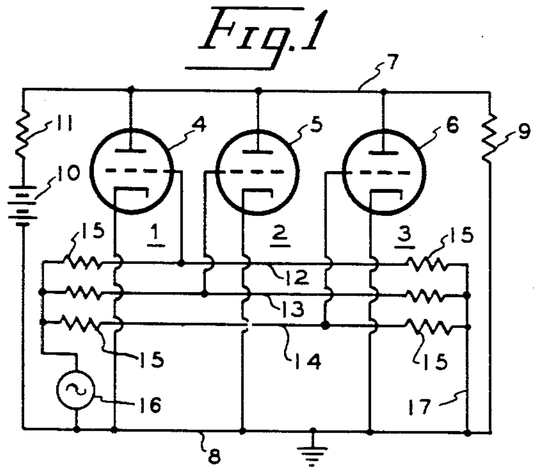
Figure 1 is a schematic circuit diagram of a distributed amplifier having isolated grid conductors.

In Figure 1 is illustrated a distributed amplifier stage, having three sections 1, 2, 3. The sections 1, 2, 3 each comprises a single triode vacuum tube, the tubes being identified by reference numerals 4, 5, 6, respectively. The conductor 7 represents a plate transmission line, which may in physical structure consist of a strip of metal, or of an artificial line constructed of lumped inductance and capacity. For the very high frequency operation for which the present system is designed, i. e. to above 1,000 mc., a strip of metal having the requisite inductance and capacity per unit length is employed. The conductor 8 represents a ground plane, and the cathodes of the triodes 4, 5, 6 are connected thereto, the anodes being connected to phase separated points along the line 7. An output resistance 9 is connected between line 7 and ground plane 8, and matches the impedance of line 7. A source of anode voltage 10 is connected in series with a further resistance 11, and between lines 7 and 8. The resistance 11 has a value equal to the characteristic impedance of line 7.

To this point the structure of the system is conventional. In accordance with a characteristic feature of the present invention three parallel grid conductors, 12, 13, 14, are employed, which are physically in the form of three parallel laterally separated strips of metal having the requisite inductance and capacitance per unit length. The lines 12, 13, 14 are each terminated at their ends by resistances 15, equal to the characteristic impedances of the lines, and the lines at their reverse ends are connected via the terminating resistances 15 to ground plane 8 via a source of signal 16. At the load end of the grid line a simple connection to ground is employed, as at 17.

The grid of tube 4 is connected to line 12, the grid of tube 5 to line 13, and the grid of tube 6 to line 14. The connections of the grids are made to points of at least nearly the same phase delay as are the connections of the plates to the line 7.

Since the lines 12, 13, 14 are geometrically in parallel, and subjected to identical signals, no difference of potential exists between any of these lines at any point therealong, and hence no capacitive coupling. Since current flow is slight, negligible magnetic coupling exists.

The signal impressed on the lines 12, 13, 14 travels down these lines and is absorbed in terminating resistances 15, at the load end of the lines. The triodes 4, 5, 6 pass current in response to the signals, and the resulting voltage wave passes down the line 7, and to the load 9. The contributions of the separate triodes add in phase in the line 7, and hence in the load 9.

To the extent that feedthrough occurs via grid-to-plate capacity, in any one tube, this signal is isolated in the appropriate grid line, and cannot affect any other tube.

Corresponding elements in the several figures are assigned the same numerals of reference, and elements corresponding with those present in Figure 1, and heretofore described and explained, are not further discussed, to avoid undue prolixity.

Figure 2:
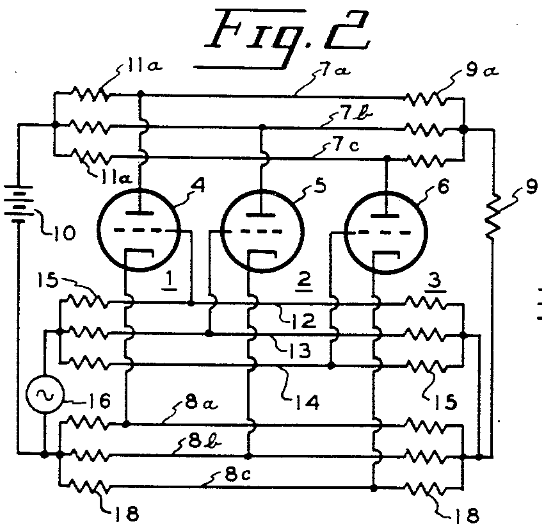
Figure 2 is a schematic circuit diagram of a modification of the system of Figure 1, employing isolated grid and anode lines.

In Figure 2, not only are three grid lines 12, 13, 14 provided for the separate grids of triodes 4, 5, 6 but also separate plate lines 7*a*, 7*b*, 7*c*, for the anodes of triodes 4, 5, 6, these being terminated at the reverse end separately by resistances 11*a*, each equal to the surge impedance of its line. At the load end of the system the separate line terminating resistances 9*a* and in series with the load resistance 9. In addition, in place of ground plane 8, I employ separate ground lines 8*a*, 8*b*, 8*c*, for the separate triodes, and I terminate these by surge impedances 18.

Accordingly, in the system of Figure 2 all electrodes of each triode are isolated with respect to feed through from any other. The system of Figure 2 represents the ultimate in isolation, in accordance with the invention, and probably more than is required, as a practical matter.

Figure 3:
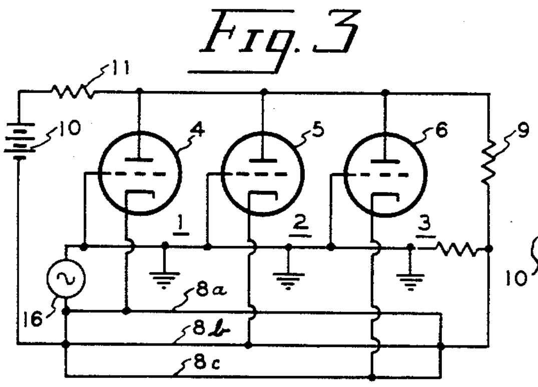
Figure 3 is a schematic circuit diagram of a further modification of the invention, employing grounded grids and isolated cathodes.

The system of Figure 3 represents a grounded grid variant of the system of Figure 1, in which the cathodes of triodes 4, 5, 6, are isolated, in accordance with the teaching of the invention, and the grids grounded, line 19 here representing a ground plane. In addition cathode lines 8*a*, 8*b*, 8*c* are not terminated, except by reverse termination 11 and load impedance 9. Clearly the mode of termination employed in Figure 2 may be employed, if excessive reflection occurs. The lines 8*a*, 8*b*, 8*c* may, however, be selected to have appropriate characteristic impedance, for matching load 9 and reverse plate termination 11 though the lines are paralleled.

In the system of Figure 3 isolation accrues due to grid grounding, as well as due to cathode circuit isolation.

Figure 4:
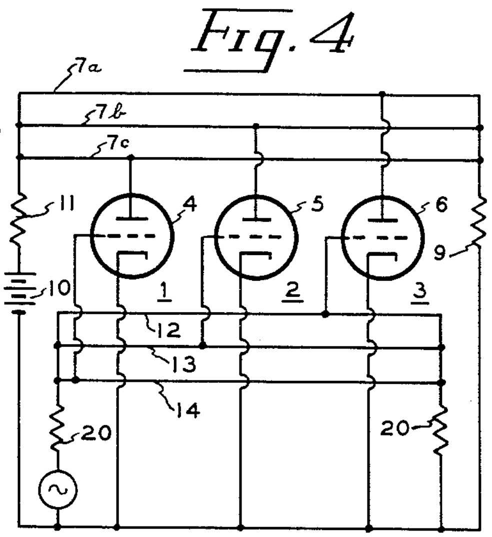
Figure 4 is a schematic circuit diagram of a further embodiment of the invention, employing isolated grid and anode lines, and utilizing a minimum number of terminating resistances.

In the species of Figure 4, normal grid drive and cathode ground plane is employed, as in Figure 1, and a minimum of terminating resistances. Both grid and plates lines are isolated, in accordance with the invention, so that signal voltage developed by one tube does not appear at the plate of any other tube. This is a novel factor, and advantageous in increasing gain, since in the conventional system while the grid of a given tube is attempting to lower plate voltage, adjacent tubes feed voltage from plate to plate, along the plate line, which tends to nullify the attempt. In the system of Figure 4, signals do not add in the plate lines, but only in the load itself.

Figure 5:
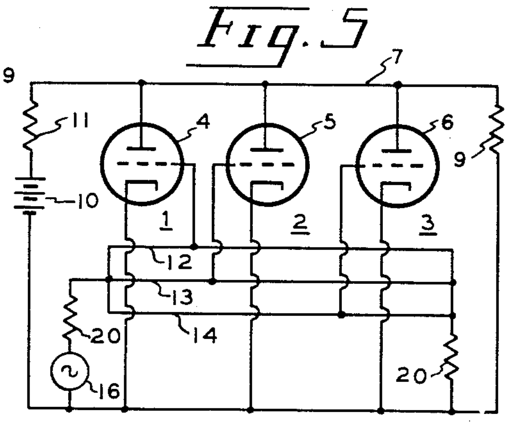
Figure 5 is a schematic circuit diagram of a modification of the system of Figure 4, employing only isolated grid lines.

The system of Figure 5 parallels the system of Figure 1 very closely, employing driven grids, and a cathode ground plane. The distinction resides in that the circuit of Figure 5 has eliminated the separate terminating impedances in grid lines 12, 13, 14, in favor of a single terminating impedance 20 for all grid lines. This is adequate, since the lines 12—14 have no voltage therebetween, and therefore current cannot flow from one to the other via the short circuited ends.

Figure 6:
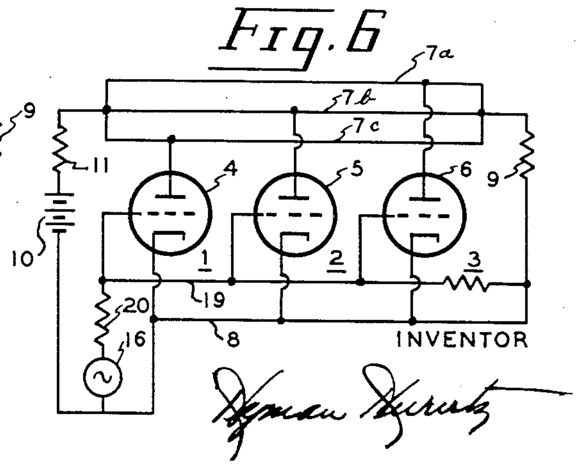
Figure 6 is a schematic circuit diagram of a modification of Figure 4, employing only isolated plate lines.

The system of Figure 6 employs only plate circuit isolation, relying on this isolation to effect grid isolation. This is justified to the extent that in the circuit of Figure 6 no feedthrough from one anode to another is possible, and hence no feedthrough from any one anode to other than its own grid (except via the grid line). This implies imperfect isolation, to some extent, and the system of Figure 5 is therefore to be preferred, where extreme simplicity is essential. The system of Figure 4 is the preferable system from the point of view of extreme effectiveness, at the cost of some loss of simplicity in comparison with the system of Figure 5.

While I have described and illustrated one specific embodiment of my invention, it will be clear that variations of the general arrangement, and of the details of construction which are specifically illustrated and described, may be resorted to without departing from the true spirit and scope of the invention.

What I claim is:

1. In a distributed amplifier having a plurality of vacuum tubes having each at least an anode electrode, a cathode electrode and a control electrode, a source of signals, means comprising a transmission line for applying the signals from said source in successively delayed phase relation between the control electrodes and cathodes of succeeding ones of said tubes, a common load for said anodes, and means comprising a transmission line for producing signal substantially co-phasally in said load in response to the signals between said cathodes and control electrodes, the combination wherein at least one of said transmission lines is a multiconductor transmission line having a separate conductor connected to each electrode of corresponding type, said conductors conductively isolated from one another at all points intermediate their ends.

2. The combination in accordance with claim 1 wherein said first mentioned transmission line is a multi-conductor transmission line having a separate conductor connected to each of said control electrodes.

3. The combination in accordance with claim 1 wherein said second mentioned transmission line is a multi-conductor transmission line having a separate conductor connected to each of said anode electrodes.

4. The combination in accordance with claim 1 wherein both said first mentioned and said second mentioned transmission lines are multi-conductor transmission lines having each separate conductors connected to separate ones of said electrodes.

5. A distributed amplifier having a plurality of triode vacuum tubes, a cathode conductor, a grid conductor for each of said tubes, an anode conductor for each of said tubes, said grid and anode conductors all constructed and arranged to have substantially identical phase propagation constants, means for connecting each of said anodes to a different one of said anode conductors, at spaced points therealong, means for connecting each of said grids to a different one of said grid conductors at like spaced points therealong, and with the grid and anode of each tube connected to points of said conductors of at least nearly the same phase delay, a common input circuit for said grids, and a common output circuit for said anodes, said grid conductors and said anode conductors all mutually isolated conductively at all points intermediate their ends.

6. A distributed amplifier having a plurality of vacuum tubes connected in distributed relation, each having an anode electrode, a cathode electrode and a control electrode, a first transmission line connected to one set of like electrodes, said like electrodes connected respectively to points of different phase delay along said first transmission line, a second transmission line, means for connecting another set of like electrodes to said second transmission line at points of different phase delay along said second transmission line, means for connecting a source of signals between a third set of like electrodes and an input end of one of said transmission lines, means for deriving output signals from at least one of said transmission lines, in substantially co-phasal relation from all said tubes, at least one of said transmission lines being a multi-conductor transmission line having different electrodes of like type connected to the separate conductors, said conductors being conductively isolated from one another at all points intermediate their ends.

7. The combination in accordance with claim 6 wherein both said transmission lines are multi-conductor transmission lines having different electrodes of like type connected to the separate conductors.

8. In a distributed amplifier having a plurality of electronic control devices having each at least an electron source electrode, an electron collector electrode and a control electrode, means comprising a first phase delay line for applying signals from a source in successively phase delayed relation between corresponding pairs of electrodes of succeeding ones of said electronic control devices, a common load for said electronic control devices, means comprising a second phase delay line for applying output signals from said electronic control devices substantially cophasally to said load, at least one of said phase delay lines being a multi-conductor phase delay line having a separate conductor connected to each electrode of corresponding type, said conductors conductively isolated from one another at all points intermediate their ends.

9. The combination in accordance with claim 8 wherein said electrodes of corresponding type are control electrodes.

10. The combination in accordance with claim 8 wherein said electrodes of corresponding type are electron source electrodes.

11. The combination in accordance with claim 8 wherein said first and second phase delay lines are multiconductor delay lines having lines which are mutually electrically isolated at all points intermediate their ends.

12. The combination in accordance with claim 8 wherein said electrodes of corresponding type are electron collector electrodes.

References Cited in the file of this patent

UNITED STATES PATENTS

| | | |
|---|---|---|
| 2,122,772 | Green | July 5, 1938 |
| 2,263,376 | Blumlein et al. | Nov. 18, 1941 |
| 2,593,948 | Wiegand et al. | Apr. 22, 1952 |

OTHER REFERENCES

"Distributed Amplification" by Ginzton et al., from IRE. Proceedings, vol. 36, No. 8, Aug. 1948, pp. 956–969.

"Distributed Amplification" by Cormack, from "Electronic Engineering," vol. 24, Issue 290, pages 144–147, pub. April 1952.